Dec. 3, 1940.   A. S. WESTON   2,224,072
DISPENSING CONTAINER
Original Filed March 24, 1937
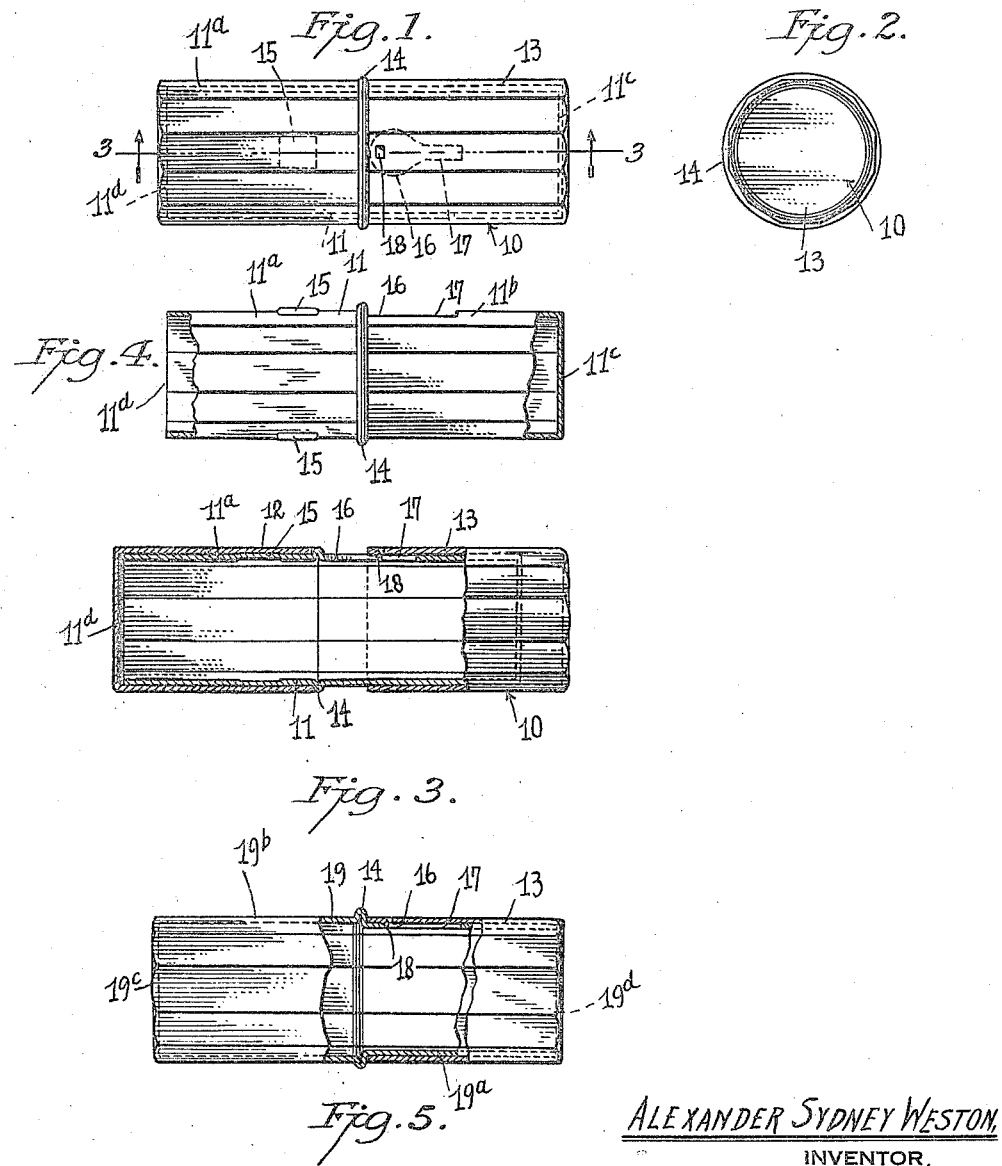
ALEXANDER SYDNEY WESTON,
INVENTOR,
BY Julian J. Wittel,
his ATTORNEY.

Patented Dec. 3, 1940

2,224,072

UNITED STATES PATENT OFFICE 2,224,072

DISPENSING CONTAINER

Alexander Sydney Weston, New York, N. Y.

Refiled for abandoned application Serial No. 132,774, March 24, 1937. This application August 3, 1939, Serial No. 288,175

1 Claim. (Cl. 206—42)

This application is a refile for abandoned application filed March 24, 1937, Serial No. 132,774.

This invention relates to containers or receptacles for small articles, like candy or mint pellets, tablets of medicines, breath perfumers and the like, and has for its main object to provide a novel simple and attractive container or receptacle of the type described which will be adapted to be carried on the person, like in a pocket, in a ladies hand bag, etc., which will have means incorporated therein to easily eject or dispense a desired number of its contents, and which will be reliable in closing and easily operated and guided in its opening movement.

Other objects of this invention will be apparent as the specification of the same proceeds.

In the drawing:

Fig. 1 is a side elevation of my novel container in a closed position;

Fig. 2 is an end elevation thereof;

Fig. 3 is a sectional view of the same in an open position;

Fig. 4 is a side elevation of an inner shell used in the preferred embodiment of my device, while Fig. 5 is a partly sectional side elevation of a modification of my invention.

Referring now to the drawings more closely, by characters of reference, the numeral 10 indicates my device, in general, in its fully assembled condition, the same comprising, in the preferred embodiment thereof, shown in Figs. 1 to 4, three parts, being an inner shell 11, a stationary cap or outer half shell 12, adapted to engage the left hand side 11a of the inner shell 11, as shown in Fig. 4, and a slidable cap or outer half shell 13 adapted to engage the right hand side 11b of the inner shell 11.

All these shells are of multisided prismatic form, the outer half shells or caps 12 and 13 being adapted to snugly slide on the respective portions 11a and 11b of the inner shell 11, but being prevented from a turning or rotary motion in relation thereto.

The portion 11b of the inner shell may have a bottom 11c, while the respective outer end 11d of the left hand portion 11a of said shell 11 may be left open. In the central transverse plane of the shell 11 a circular lock or limit projection 14 may be pressed out of its material, and one or more, preferably rectangular, raised portions 15 may be pressed out of the material of the left hand portion 11a, while the right hand portion 11b may be provided with a preferably circular opening or hole 16 in its wall, continued in a narrow slot 17.

The right hand outer half shell or cap 13 may be provided with an inward projection or tooth 18, preferably struck of its own material and adapted to ride in the narrow slot 17.

The use and operation of my device is as follows:

The inner shell 11 will first be filled with pieces of candy, medicine, etc., through its open end 11d, the right hand slidable outer shell 13 having previously been applied thereto and closed up to the central embossed ring 14, whereupon the left hand outer shell 12 will be forced on the portion 11a of said inner shell and pressed tightly to said limit 14, as shown in Fig. 1.

The raised portion 15 will secure said outer shell 12 in a comparatively permanent manner on the left side 11a of the inner shell 11, while the right hand outer shell or cap 13 will be secured in its closed position, shown in Fig. 1 by a milder frictional action only, and may be moved outwardly, its tooth or projection 18 first riding freely in the large circular opening 16 and then in a tighter guided manner in the slot 17, as indicated in Fig. 3, in a middle position of its travel.

When the outer shell 13 is thus moved into a right hand direction, the central large opening or hole 16 will be uncovered to a desired degree and the contents of the container thrown or shaked out or ejected therefrom, as will be obvious.

The projection or tooth 18 will guide the movable outer shell 13 and also will provide a limit to its right hand slide and prevent its entire freeing from the inner shell or container proper 11.

The multisided identical prisms forming the shape of each part of my container, will impart to the same attractive appearance and at the same time will facilitate its assembly and its working, as described.

In Fig. 5, I illustrate a modification of my device wherein an inner shell 19 is employed, generally similar in construction to the inner shell 11 described hereinbefore, with the exception that in this modification, the right hand side 19a, is of smaller diameter than the left side 19b. Said right hand side 19a is shown in this embodiment as being open at its outer end, as at 19d, while the outer end 19c of the left hand portion 19b thereof is closed.

A large hole 16 and a guiding slot 17, similar to those described hereinbefore, can be provided in the right hand portion 19a of the inner shell, and an outer shell 13, entirely identical with the outer shell 13 described hereinbefore, may be employed to slidably close or open said dispensing recess 16 in the manner described hereinbefore, having a limiting or guiding projection or tooth 18.

In this modification, my device is composed of two parts only; the inner shell 19 and the slidable outer shell 13.

While I have shown and described the preferred embodiments of my invention, I want it to be understood that changes and variations may be made in the construction and combination of the parts, and I want to reserve my rights to such changes and variations as are within the spirit of this specification, and the scope of the claim hereunto appended.

What I claim as new, is:

A dispensing container comprising a multisided prismatic sleeve open at one end, and having an outwardly projecting circumferential lug pressed out of its material intermediate of its ends; a dispensing cap for said sleeve being of identical multisided prismatic shape adapted to close upon the closed end of said sleeve and to closely engage the same, but still being slidable thereon, another cap for the other open end of said sleeve also being of identical multisided prismatic shape adapted to be pushed over the respective end of said sleeve and to remain thereon by close frictional action, each cap being adapted to be pushed over said sleeve up to said projecting lug as the limit to their motions; a dispensing opening being provided in said sleeve adjacent to said lug on its portion covered by said dispensing cap, said opening being continued towards the respective end of said sleeve in a narrow slot, and an inwardly struck spike on said dispensing cap adapted to ride in said opening and said slot to limit the outward movement of said dispensing cap by reaching the outward end of said slot.

ALEXANDER SYDNEY WESTON.